July 6, 1937.  P. L. DOLLISON ET AL  2,085,849

TIME KEEPING AND INDICATING APPARATUS

Filed Jan. 4, 1935   3 Sheets-Sheet 1

Inventors
Paul L. Dollison
James A. Cook

By W. S. McDowell
Attorney

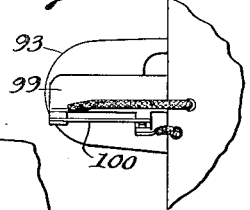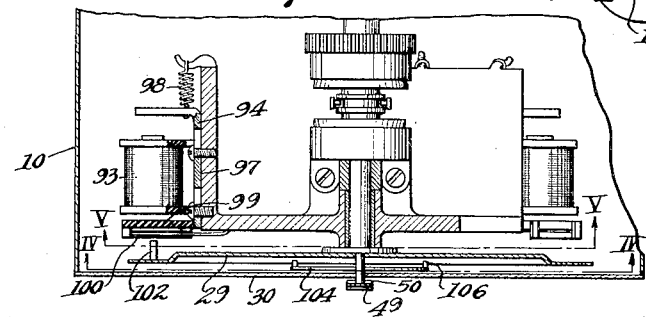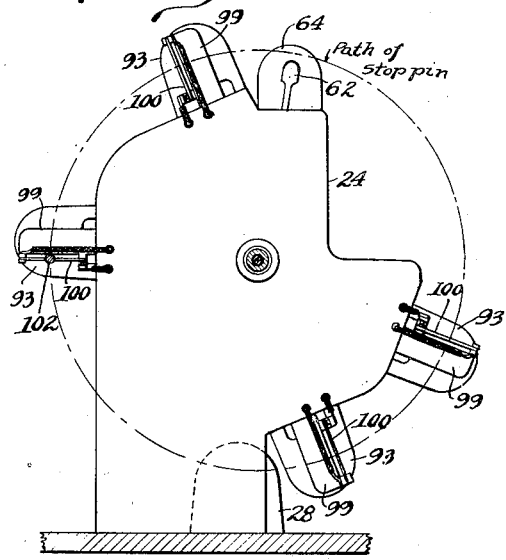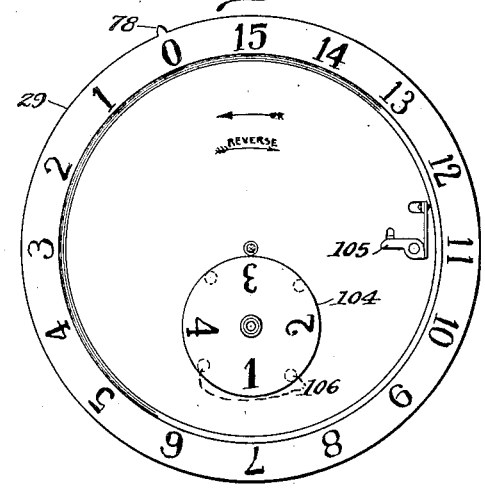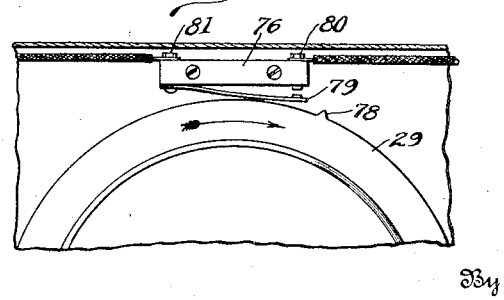

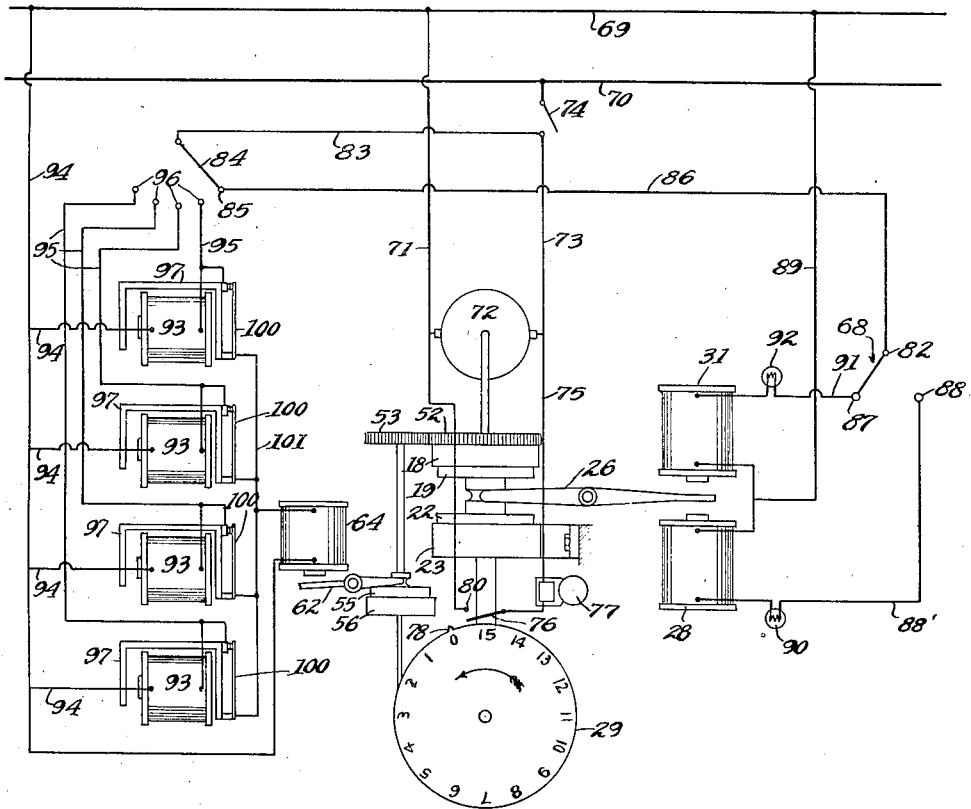

Patented July 6, 1937

2,085,849

UNITED STATES PATENT OFFICE 2,085,849

TIME KEEPING AND INDICATING APPARATUS

Paul L. Dollison and James A. Cook, Logan, Ohio

Application January 4, 1935, Serial No. 408

13 Claims. (Cl. 161—17)

This invention relates to an improved time keeping and indicating device especially adapted for use in controlling and indicating the duration of given periods of activity such as are encountered in various sports, for instance, as in measuring and indicating the length of the periods employed in the games of football, basket ball or other sports wherein the play takes place over definite periods of time. However, the present invention in its broader aspects relates to time keeping and indicating mechanism which may be put to other uses than those narrated.

At the present time in the determination of the length of the playing periods in the games of football and basket ball particularly, the duration of the periods is determined by a particular official employed for that purpose. During the playing of such periods, time may be called out for various reasons and the timekeeper must make adjustment to compensate for these intervals when no playing is taking place. This often leads to confusion and mistake and places the sole responsibility of keeping accurate time regarding the playing periods at the discretion of the timekeeper or other official selected for that purpose.

It is an outstanding object of the present invention to provide a substantially automatic and accurate time keeping instrument under convenient manual control by which the playing time of recreational games such as basket ball and football may be rapidly and accurately ascertained and maintained by the time keeping official and wherein the operation of the apparatus may be observed by both spectators and officials alike so that the possibility of error in the maintaining of accurate time periods will be reduced to a minimum.

It is another object of the invention to provide a time keeper and indicator of the character set forth wherein provision is made for denoting both the minutes and seconds which remain to be played in a given period and wherein provision is further made for arresting the operation of the apparatus during so-called "time out" intervals, for indicating when the apparatus is in active operation and when out of operation and for producing an audible signal automatically at the expiration of any given playing period.

It is another object of the invention to provide an electrically operated apparatus for accomplishing the above ends, among others, and to provide a remotely operated switch mechanism by which the operation of the apparatus may be governed.

With these and other objects in view, which will appear as the description proceeds, the invention consists in the novel features of construction, combination of elements and arrangements of parts hereinafter fully described and pointed out in the appended claims.

In the accompanying drawings:

Fig. 3 is a horizontal sectional view on the plane indicated by the line III—III of Fig. 1;

Fig. 4 is a front view of the minute dial and also the period indicating dial, the plane of the Figure being indicated by the line IV—IV of Fig. 3;

Fig. 5 is a similar view of the dial stopping switches, the plane of the figure being indicated by the line V—V of Fig. 3;

Fig. 6 is an enlarged detail view of one of the switches disclosed in Fig. 5;

Fig. 7 is a sectional view on the line VII—VII of Fig. 2 and illustrating the switch employed in operating the audible signal at the termination of a playing period;

Fig. 8 is a wiring diagram disclosing the circuits employed in the operation of the apparatus;

Figs. 9 and 10 illustrate diagrammatically a portion of a remotely actuated switch mechanism used in controlling the time keeping apparatus.

Figure 1:
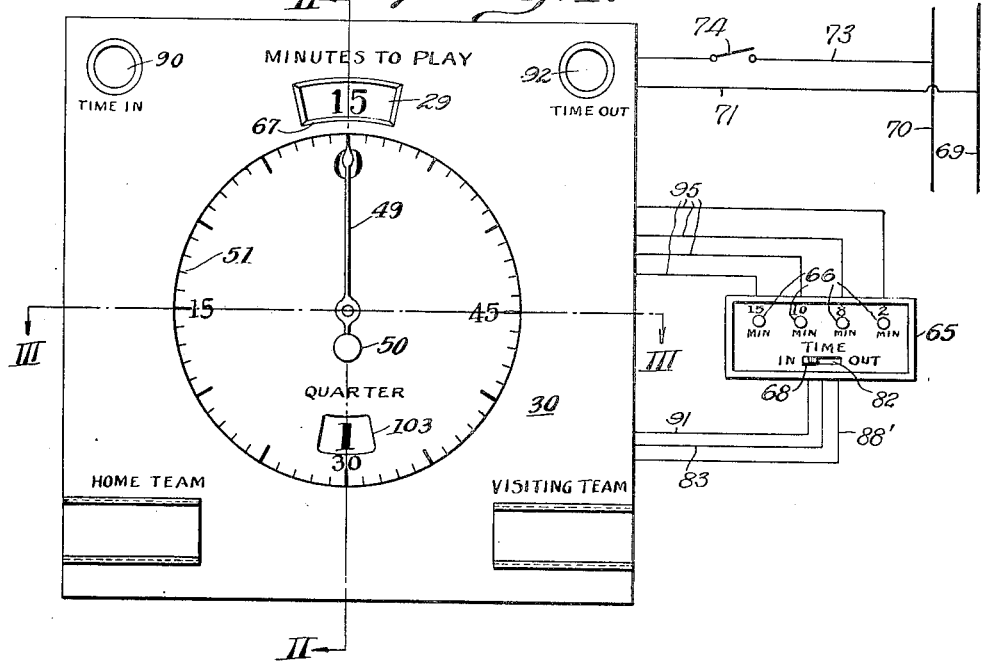
Fig. 1 is a front elevation of the time keeping apparatus comprising the indicator section of the present invention, the control switch mechanism thereof being indicated diagrammatically.
Figure 2:
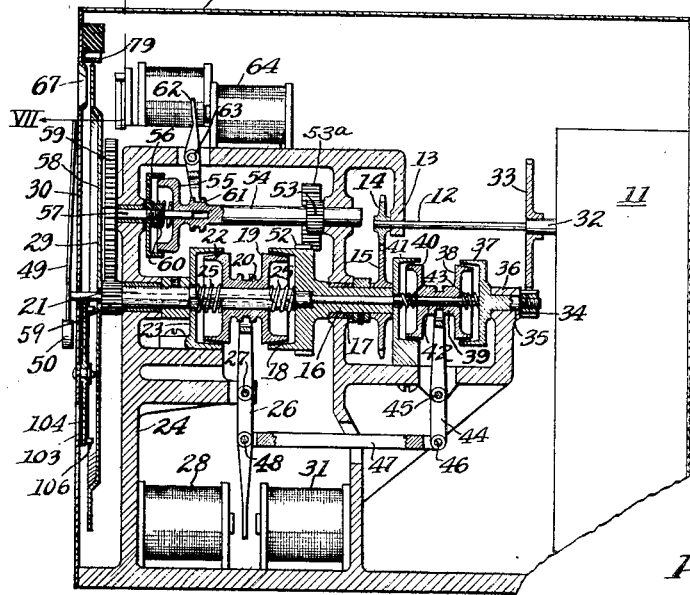
Fig. 2 is a vertical longitudinal sectional view taken through the indicating section on the plane indicated by the line II—II of Fig. 1.

Referring more particularly to the drawings, the indicating section of the time keeping apparatus comprising the present invention, as shown more particularly in Figs. 1 to 2, includes a suitable casing 10, in which is mounted a clock mechanism 11, driven preferably by a synchronous motor of the electrically operated type, adapted for operation on standard commercial circuits. This clock mechanism includes an extended primary shaft 12 having its outer end supported for rotation in a bearing 13 and equipped with a gear 14, the teeth of which mesh with a registering gear 15 fixed upon one end of a sleeve 16, the latter being rotatably mounted in connection with a stationary bearing 17.

The outer end of the sleeve 16 terminates in a clutch cone 18 adapted for engagement with a driven cone 19 formed in connection with a sliding quill 20, which is keyed upon a sleeve 21. The opposite end of the quill 20, as regards the cone 19, is provided with a second cone 22 arranged for engagement with a brake drum 23 stationarily supported in connection with the frame structure 24 of the casing 10. Coil springs 25 surround the sleeve 21 and are interposed between the clutch cone 18 and the driven cone 19 and between the brake cone 22 and the drum 23, the normal tendency for said springs being to maintain the cones 19 and 22 out of engagement with the cone 18 and the drum 23 respectively.

In order to impart movement from the cone 18, which is driven by the minute shaft 12, to the sleeve 21, the quill 20 is formed with an annular groove between the cones 19 and 22, in which is received the yoke-shaped upper end of an operating lever 26, the latter being pivoted as at 27 upon the frame structure 24 at a point intermediate of its length. The lower end of the lever 26 acts as an armature and is located adjacent to an electromagnet 28. The latter, when energized, serves to rock the lever 26 in order to effect engagement between the cones 18 and 19, thus imparting movement to the sleeve 21. The outer end of the latter is connected with a minute dial 29 which is arranged for rotation immediately behind the stationary outer wall 30 of the casing 10. As shown in Fig. 4, the periphery of the dial 30 is provided with numerals indicating minutes from zero to fifteen. This may be varied however, in accordance with the uses to which the apparatus is placed.

It will be seen from the foregoing that when the clock mechanism is operated and the magnet 28 energized, the clutch mechanism 18 and 19 will be engaged to effect measured rotation of the minute dial in unison with the primary shaft of the clock mechanism, the gear ratio being such that the minute dial will effect substantially a complete revolution once in every fifteen minutes.

To arrest the rotation of the minute dial, the lower end of the lever 26 has arranged on the opposite side thereof, as regards the magnet 28, a second electromagnet 31. When the magnet 31 is energized, the lever 26 is moved in an opposite direction to that when the magnet 28 is energized. This results in causing the cone 22 to engage with the stationary brake drum 23, thereby interrupting the driving engagement between the clutch cones 18 and 19 and positively retaining the minute dial against rotation during the "time out" interval and until the magnet 28 is again reenergized.

The clock mechanism 11 includes a tubular secondary shaft 32 which carries a gear 33, the teeth of which mesh with the pinion 34 fixed upon one end of a shaft 35 journaled in a bearing 36, formed in connection with the frame structure 24. The shaft 35 drives a clutch drum 37 in unison therewith and arranged for engagement with the drum 37 is a clutch cone 38. This cone is carried by a quill 39, which also carries an opposed cone 40 adapted for cooperation with a stationary brake drum 41 mounted in connection with the frame structure 24. The quill 39 is slidably keyed to a shaft 42 and coil springs 43 are arranged between the cones 38 and 40 and the clutch and brake drums 37 and 41 to normally space these drive regulating members.

The cones 38 and 40 may be selectively engaged with the drums 37 and 41 by providing the quill 39 with an annular groove in which is engaged the upper end of a pivoted shifting fork 44, the latter being pivotally mounted as at 45 in connection with the frame structure 24, and has its lower end pivotally connected as at 46 with a link 47, the opposite end of the latter being pivotally connected as at 48 with the lever 26. This link arrangement causes the clutch and brake mechanisms of the minute and second hands to operate simultaneously and in unison with one another, so that proper relationship between the minute and second indicators may be constantly maintained during any given playing period. The shaft 42 extends forwardly through the sleeve 16 and the sleeve 21 and at its extreme forward end projects through an opening in the front wall 30 of the casing 10. The forward end of said shaft 42 has fixed thereto a second indicating hand 49, suitably counterweighted as at 50, the pointer end of the hand 49 being arranged for travel over a graduated dial 51 indicating seconds, and which is suitably applied to the outer surface of the wall 30.

In order to effect reverse rotation of the minute dial 29 to reset the same and to denote the beginning of a playing period of predetermined length, the clutch drum 18 is provided with peripheral gear teeth 52 which are adapted to mesh with the teeth of a gear 53 fixed upon a countershaft 54, journaled in connection with the frame structure 24. The forward end of the shaft 54 is provided with a clutch cone 55 arranged for engagement with a clutch drum 56, the latter being fixed to one end of a shaft 57, arranged in registering axial relationship with the counter shaft 54 and rotatably supported by the frame structure 24. The shaft 57 carries at its outer end a gear 58 disposed to mesh with the internal teeth provided on a gear ring 59, the latter being secured to or formed with the rear face of the minute dial 29. Normally, the cone 55 and the drum 56 are maintained out of driving contact by the provision of a spring 60, which separates these clutch members. The counter shaft 54 is however, equipped with a collar 61 formed with an annular groove in which is received the lower portion of a shifter fork 62, the said fork being pivoted as at 63 in connection with the frame 24. The upper end of the fork 62 is disposed contiguous to an electromagnet 64 which, when energized, rocks the fork 62 so as to effect driving engagement between the cone 55 and the drum 56 against the resistance offered by the spring 60, thereby causing the rotation of the minute dial in a direction opposite to that effected through the sleeve 21.

Usually, the indicator section of the apparatus is mounted in a position so that it may be viewed by the officials and spectators of the game alike, and, therefore, in order that its operation may be regulated by the official of the game from a remote point, we employ a control unit 65, the latter containing a number of selector buttons 66 which govern the operation of associated switches and circuits for automatically positioning the minute dial 29 so that the minute numerals on the periphery thereof may be properly presented to the sight apertures 67, formed in the wall 30, and through which the numerals on the minute disk may be viewed by the spectators and timekeeping official. For instance, if it happens that a particular playing period should amount to fifteen minutes, the selector button marked 15 may be depressed, thereby bringing the numeral 15 on the minute disk into registration with the aperture 67. The unit 65 is also provided with a further switch control 68 by which switch mechanism will be operated to effect or arrest the time keeping operation of the instrument.

The wiring diagram has been disclosed in Fig. 8 wherein the numerals 69 and 70 represent the leads of a commercial source of electric current supply. From the lead 69, a wire 71 extends to the electric motor 72 employed for operating the clock mechanism 11, and the return from the motor 72 is effected by a wire 73, which leads through a control switch 74 to the lead 70. When the switch 74 is closed, the motor of the clock mechanism will be operated.

A shunt circuit 75 connects with the wires 71 and 73 and leads to a normally open automatic switch 76, disclosed in Figs. 7 and 8, the said shunt circuit also including an audible alarm, such as an electric bell or buzzer as indicated at 77. On the periphery of the minute dial 29, there is disposed a projection 78, which is disposed in registration with the zero minute numeral, so that at the end of a playing period, when the zero numeral aligns with the aperture 67, the projection 78 will engage with the spring leaf 79 of the switch 76, in order to move said leaf into circuit closing engagement with a stationary contact terminal 80, connected with one of the wires of the circuit 75, the other terminal 81 being constantly connected with the resilient leaf 79. The closing of the switch 76 results in energizing the alarm 77 so that the latter will sound to audibly denote the expiration of the playing period.

When it is desired to start the operation of the apparatus, the switch 74 is closed and the minute dial actuated to bring the proper numeral into registration with the aperture 67. Rotation of the minute dial and the second hand 49 to measure the playing period is then effected by operating the switch 82, shown in Fig. 8 in order to selectively energize the clutch magnet 28, whereby through the lever mechanism associated with the magnet 28 to connect the driving and driven members of the cone clutches in driving relationship in order to effect simultaneous operation of the minute dial and the second shaft in synchronism with the clock mechanism 11.

As shown in Fig. 8, current is conveyed to the switch 82 by a shunt lead 83 which is connected with the conductor 73 and extends to the switch 84, thence through a contact button 85 to a wire 86 which is connected with the pivotal mounting of the switch 82. The latter operates between contacts 87 and 88 so that when the switch 82 is in engagement with the contact 88, current will flow through the windings of the magnet 28 and thence by way of the conductor 89 to the lead 69. It will be understood that since the leads 69 and 70 are conductors of alternating current, it is immaterial in which direction current travels through the various wires or conductors comprising the circuit in which the magnet 28 is situated. Likewise, to energize the brake magnet 31, current may flow from the incoming lead 69, through the conductor 89, thence through the windings of the magnet 31 to the contact 87, thence through the switch 82, the conductor 86, the switch 84, conductor 83 and switch 74 to the lead 70, or vice versa.

Thus the operating positions of the switch 82, carried by the control unit 65, will determine which of the magnets 28 or 31 will be energized. To start the apparatus, the switch 82 is moved to energize the magnet 28, and to stop the operation of the apparatus at any time during a given playing period for "time out" purposes, it is merely necessary for the official to actuate the switch 82 to energize the magnet 31. Due to the provision of the brake controls during "time out" intervals, the positions of the minute dial and the second hand will be maintained until playing is again resumed at which time the official returns the switch 82 to the contact 88, reenergizing the magnet 28 which again sets the apparatus into operation.

In the conductor 88', which leads from the contact 88 to the windings of the magnet 28, there is arranged an incandescent lamp, or other equivalent signal 90, while in the conductor 91, which extends from the contact 87 to the windings of the magnet 31, a second similar visual signal or incandescent lamp 92 is arranged. The lamps 90 and 92 are arranged on the board 30 so that they may be seen by the officials and spectators and are distinctively colored. For instance, the lamp 92 may be red and the lamp 90 green. These lamps provide the spectators and officials with a positive means for knowing when the instrument is in and out of active operation and enables the spectators to follow the work of the time keeping official very accurately, to the end of avoiding mistakes or misunderstandings, which can so readily occur in athletic pursuits where a single official has complete control over the duration of a playing period, such as in boxing, football or basket ball.

In order to reverse the direction of rotation of the minute dial 29 at the end of a given playing period so that it may be automatically and properly set to measure the duration of the next following playing period, the frame 24, as shown particularly in Figs. 3 and 5 carries a plurality of electromagnets 93. The field of each of these magnets is connected by one or more conductors 94 with the lead 69, and the opposite terminals of the magnet windings 93 are connected with spaced conductors 95 which lead to contact points 96, shown in Fig. 8, which are adapted to cooperate with the movable switch arm 84, so that the return current may pass by way of the conductor 83, the switch 74, to the lead 70. When the instrument is in active operation recording the time of a given playing period, the switch 84 is in contact with the terminal 85, thus enabling either of the magnets 28 or 31 to be energized, whereas during the resetting period, the switch 84 is selectively moved to engage any one of the contacts 96, and by being out of contact with the member 85, operation of the magnets 28 and 31 will be prevented, so that the brake and clutch members, governed by the magnets 28 and 31, will be in neutral positions by reason of their associated springs.

The selective energizing of the magnets 93 is provided for in order to vary, or permit of variation, in the duration of a given playing period. For example, in football, playing periods of twelve to fifteen minutes are often used and we have found that by employing four of the magnets 93, which provide for periods of fifteen minutes, ten minutes, eight minutes and two minutes, the apparatus is well suited for the majority of games. The selection of these playing periods may be controlled by the selector button 66 on the control unit 65.

The energizing of any one of the magnets 93 causes the same to attract a sliding armature saddle 97, one of such saddles being carried in connection with each of the magnets 93. Each saddle is slidably carried in connection with the frame 24, the movement thereof away from the pole of its corresponding magnet being effected by a coil spring 98. The outer end of each saddle is equipped with an insulating panel 99, upon which is mounted a normally closed spring switch 100. Thus whenever any one of the buttons 66 is depressed, the corresponding magnet 93 is energized and current will flow by way of the conductor 94 to the field of the reverse or re-setting magnet 64 and from the opposite field terminal of the magnet 64 by way of conductors 101 to the movable element of the spring switches 100, and thence through the switches 84 and 74 to the trunk lead 70. This results in the operation of the fork 62 and the associated clutch mechanism used for operating the gearing 58 and 59, causing reverse or re-setting rotation of the minute disk.

To automatically arrest such reverse or re-setting movement of the minute disk, the latter is provided, as shown in Fig. 3, with a fixed pin 102 which rotates with and projects from the back side of the minute disk contiguous to its peripheral portion. When one of the magnets 93 is energized, the saddle 97 associated therewith is moved toward the pole of the energized magnet, which brings the panel 99 thereof, carrying the switch 100, out into the path of movement of the pin 102. The orbit of movement of this pin is disclosed in dotted lines in Fig. 5 and it will be seen that as the re-setting rotation of the minute dial takes place, such rotation will be automatically arrested by the engagement of the pin 102 with the switch 100 which has been projected into the path of the pin through the associated energized magnet 93. The pin 102 will first engage with the switch 100 so as to interrupt the circuit leading to the field of the reversing magnet 64, thereby discontinuing the positive reverse drive to the minute dial. The pin will then contact with the adjoining edge of the panel 99, bringing the minute dial to a fixed stop with the desired minute numeral thereon in registration with the aperture 67. The switches 82 and 84 may then be operated to again rotate the minute dial in a direction employed for measuring playing periods, which is anti-clockwise, as shown in Fig. 4.

The play board or wall 30 is provided with a second aperture 103 behind which is mounted a wheel 104 bearing the numbers of playing periods, for instance, in football, the four playing periods. The wheel may be automatically turned to bring the numerals thereon into registration with the aperture 103 by providing the minute disk with a spring pressed detent 105 so arranged as to engage the studs 106 spaced at intervals on the wheel 104. As the minute dial revolves in a clockwise direction, the studs on the wheel 104 will be engaged by the detent 105 for a sufficient interval of time to effect 90° of rotation on the part of the said wheel. The mounting of the detent is such that it will operate the wheel only when the minute dial is moved in this direction.

The switch mechanism per se, shown diagrammatically in Figs. 9 and 10, forms no part of our invention, the showing being included merely for the purpose of illustrating one manner in which current flow to the clutch and brake operating mechanism can be interrupted simultaneously with the initiation of current flow to the resetting mechanism. This renders the clutch and brake inactive so that no undue strain will be put on the mechanism during the resetting operation.

In view of the foregoing, it will be seen that the present invention provides apparatus for employment in the keeping of time incident to the measurement of playing periods of various athletic sports. The construction of the device is such as to enable spectators, players and time-keeping officials to ascertain quickly and correctly the time remaining in a given period of play or activity. This is particularly important in sports such as boxing, football and basket ball where if the playing period is under-estimated or over-estimated, the game loses its elements of sportsmanship and fairness. Also, the apparatus is particularly useful in correctly ascertaining playing time as it may be instantly stopped when for any reason time is taken out during a playing period and should not be recorded. Then, at the expiration of such a "time out" period, the operation of the apparatus may be instantly restored without any loss of position of the time denoting members. At the end of a given playing period, the apparatus provides for the sounding of an audible gong or alarm by which the playing period is terminated. Visual signals are also provided so that all those observing the instrument may know at a glance whether it is in or out of operation.

Various changes may be made in the apparatus from the specific form herein disclosed without departing from the essential features and principles of the invention as the latter have been set forth in the following claims.

What is claimed is:

1. In time keeping and indicating apparatus, a casing having one of the walls thereof provided with an aperture, a clock mechanism provided with a shaft, a dial rotatably mounted within said casing and provided with minute indicating numerals arranged for registration with said aperture, motion transmitting means including a quill member having reversely disposed brake and clutch devices thereon for assisting in the control of the rotation of said dial by power derived from said shaft, a stationary brake member carried by said casing and engaged by the brake device on the quill member, magnetic controlling means for governing the operation of said brake and clutch devices to start or stop the rotation of said dial at will from a position remote to said casing, and means driven from said shaft for reversing the direction of rotation of said dial from that afforded by said first-named motion transmitting means.

2. In time keeping and indicating apparatus, a clock mechanism having primary and secondary shafts, a minute indicating dial, a hollow shaft for effecting the rotational support of said dial, a head rotatable with and slidably carried by said dial shaft, said head including reversely disposed clutch and brake members, a clutch element driven by said primary shaft and engageable with the clutch member of said head to rotate said dial in unison with said primary shaft, a stationary brake drum engageable with the brake member of said head to arrest rotation of said dial, an arbor shaft rotatably supported within said dial shaft, a second indicator fixed to the outer end of the arbor shaft, an arbor head having reversely disposed clutch and brake members rotatable with and slidably carried by said arbor shaft, a clutch element driven by said secondary shaft and engageable with the clutch member of the sliding arbor head, a stationary brake drum engageable with the brake member of said arbor head, lever devices for actuating simultaneously the heads driven by the primary and secondary shafts, and electro-responsive means for operating said lever devices.

3. The structure as specified in claim 2 in combination with spring means for normally maintaining the brake and clutch members of said heads out of engagement with the clutch elements and brake drums.

4. In time keeping and indicating apparatus, a clock mechanism having a drive shaft, a rotatable minute indicating dial, a driven shaft for effecting the rotation of said dial, a head slidably carried by and rotatable with said driven shaft, said head including spaced reversely disposed brake and clutch members, a clutch element directly driven by said drive shaft and operable when engaged by the clutch member of said head to rotate said dial in unison with said drive shaft, a stationary brake drum disposed adjacent to the brake member of said head and operable when engaged by said brake member to arrest rotation of said dial, electro-responsive means for selectively bringing the brake and clutch members of said head into engagement with said clutch element and brake drum, and a re-setting mechanism for said dial driven by said drive shaft and operable only when said electro-responsive means are deenergized to return said dial to a starting position.

5. In time keeping and indicating apparatus, a casing having one of the walls thereof provided with an aperture, a dial rotatably mounted within said casing having the peripheral portion thereof provided with numerals arranged for registration with said aperture, a clock mechanism having a drive shaft, motion transmitting means for effecting the rotation of said dial from power derived from said drive shaft, said motion transmitting means including a clutch, an electromagnet for actuating said clutch, said magnet when energized serving to permit said motion transmitting means to revolve said dial in unison with said drive shaft, gearing driven by said drive shaft for reversing the direction of rotation of said dial to effect its re-setting to a desired starting position, and an electrically actuated clutch positioned between said gearing and said dial.

6. A time keeping and indicating apparatus comprising a support, an indicating dial rotatably carried by said support, a clock mechanism provided on said support, motion transmitting means for rotating said dial in unison with said clock mechanism, a clutch member positioned between said clock mechanism and said dial, a brake provided upon said support and operative to arrest rotation of said dial, electro-responsive means for actuating said brake and clutch, a double position switch for selectively energizing said electro-responsive means, spring means for moving said brake and clutch to inactive position, reverse gearing for rotating said dial in the opposite direction, a second clutch for controlling the driving engagement of said reverse gearing with said dial, additional electro-responsive means for actuating said second clutch, and a switch mechanism for energizing said additional electro-responsive means, the actuation of said last-named switch to energize said additional electro-responsive means serving to interrupt current flow to said double position switch.

7. A time keeping and indicating device comprising a support, a dial rotatably mounted on said support, a clock mechanism provided on said support, motion transmitting mechanism for rotating said dial in unison with said clock mechanism, a clutch positioned between said clock mechanism and said dial, a brake provided upon said support and operative to arrest rotation of said dial, electro-responsive means for actuating said brake and clutch, spring means for moving said brake and clutch to inactive positions, reverse gearing for rotating said dial in the opposite direction, a second clutch for controlling the driving engagement of said reverse gearing with said dial, a second electro-responsive means for actuating said second clutch, and electro-responsive means for limiting the reverse rotation of said dial, the energization of said last-mentioned electro-responsive means serving to also energize said second electro-responsive means and deenergize said first-mentioned electro-responsive means.

8. A time keeping and indicating apparatus comprising a frame, a clock mechanism carried by said frame, said mechanism having a plurality of drive shafts, indicating members rotatably supported by said frame, motion transmitting mechanism connecting said drive shafts and said indicating members, said motion transmitting mechanism including clutch members, brake mechanisms carried by said frame and operative to arrest movement of said indicators, a pair of electro-responsive actuating members, means connecting said brakes and clutches with said actuating members whereby one of said members will operate said clutches and the other will operate said brakes, and visible electrical signals in circuit with said electro-responsive members to indicate the operation of said brakes and clutches.

9. A time keeping and indicating apparatus comprising a frame, a power driven shaft carried by said frame, an indicator rotatably supported by said frame, motion transmitting mechanism connecting said power driven shaft and said indicator, a clutch included in said motion transmitting mechanism, a brake mechanism provided upon said frame and operative to arrest rotation of said indicator, electro-responsive means for actuating said clutch and brake, switch means for energizing said electro-responsive means, additional motion transmitting mechanism connecting said indicator with said drive shaft and serving to cause the rotation of said indicator in a reverse direction to that caused by said first-mentioned motion transmitting mechanism, a second electro-responsive means for rendering said additional motion transmitting mechanism operative, a second switch means for energizing said second electro-responsive means, the actuation of said second switch means interrupting current flow to said first electro-responsive means, and means actuated by said indicator when the latter reaches a predetermined point during reverse rotation to interrupt current flow to said second electro-responsive means.

10. A time keeping and indicating apparatus comprising a frame, a power driven shaft carried by said frame, an indicating member rotatably mounted on said frame, motion transmitting mechanism connecting said indicator and said power driven shaft, clutch means forming a part of said motion transmitting mechanism, electro-responsive means for actuating said clutch, additional motion transmitting mechanism between said indicator and said power shaft for causing reverse rotation of said indicator, electro-responsive means for bringing said second motion-transmitting mechanism into operation, and a period indicator actuated by the first indicator on its reverse movement to denote the following period.

11. A time keeping and indicating apparatus comprising a frame, a power driven shaft carried by said frame, an indicator rotatably supported by said frame, motion transmitting mechanism connecting said indicator and said power driven shaft, said motion transmitting mechanism including a clutch, electro-responsive means for actuating said clutch, switch means for energizing said electro-responsive means, re-setting mechanism connecting said indicator and said power driven shaft, electro-responsive means for bringing said re-setting mechanism into operation, a plurality of radially spaced electro-responsive stop members for stopping said indicator at predetermined points during re-setting, and a switch for each of said electro-responsive stop members, the actuation of any one of said last-named switches serving to energize its respective stop member, energize the electro-responsive means for cutting in the re-setting mechanism and interrupt current flow to the electro-responsive means for actuating said clutch.

12. A time keeping and indicating apparatus comprising a frame, power driven shafts carried by said frame, a minute indicator rotatably supported by said frame, a seconds indicator rotatably supported by said frame independently of said minute indicator, motion transmitting mechanism connecting said indicators and said power driven shafts, clutch means included in said motion transmitting mechanism, brake mechanism carried by said frame to arrest movement of said indicators, electro-responsive means for actuating said brake and clutch mechanism, re-setting mechanism connecting said minute indicator and one of said power shafts for moving said minute indicator to a predetermined point, electro-responsive means for setting said re-setting mechanism in operation, and means for re-setting said seconds indicator to a predetermined point regardless of the point to which the minute indicator is re-set.

13. A time keeping and indicating apparatus comprising a support, a power driven shaft carried by said support, an indicating dial rotatably mounted on said support, said dial being provided with a plurality of graduations consecutively numbered from zero up to a predetermined number, motion transmitting mechanism connecting said dial and power-shaft to cause the rotation of said dial whereby the numbers contained thereon will be made visible consecutively from the highest to the lowest, said motion transmitting mechanism including clutch means, electro-responsive means for actuating said clutch, reverse motion transmitting mechanism connecting said dial and power shaft, electro-responsive means for rendering said reverse motion transmitting mechanism operative, radially spaced electro-responsive stop members for stopping the reverse movement of said dial at predetermined points, a switch for each of said electro-responsive stop members, and a normally closed switch carried by each of said stop members, the last-named switch serving to interrupt current flow to said reverse motion controlling electro-responsive means when the indicating dial engages the selected stop member.

PAUL L. DOLLISON.
JAMES A. COOK.